US008661805B2

(12) United States Patent
Kuma et al.

(10) Patent No.: US 8,661,805 B2
(45) Date of Patent: Mar. 4, 2014

(54) FLUID TYPE POWER TRANSMISSION SYSTEM

(75) Inventors: Masaaki Kuma, Hakusan (JP); Osamu Kodama, Komatsu (JP)

(73) Assignee: Komatsu Ltd., Tokyo (JP)

( * ) Notice: Subject to any disclaimer, the term of this patent is extended or adjusted under 35 U.S.C. 154(b) by 980 days.

(21) Appl. No.: 12/675,319

(22) PCT Filed: Oct. 6, 2008

(86) PCT No.: PCT/JP2008/068191
§ 371 (c)(1),
(2), (4) Date: Feb. 25, 2010

(87) PCT Pub. No.: WO2009/057423
PCT Pub. Date: May 7, 2009

(65) Prior Publication Data
US 2010/0236229 A1    Sep. 23, 2010

(30) Foreign Application Priority Data

Oct. 30, 2007   (JP) ................................. 2007-281257
Jan. 25, 2008   (JP) ................................. 2008-015586

(51) Int. Cl.
*F16D 33/10*   (2006.01)
(52) U.S. Cl.
USPC ............................................ 60/360; 60/359

(58) Field of Classification Search
USPC ............... 60/329, 330, 347, 359, 360; 464/24
See application file for complete search history.

(56) References Cited

FOREIGN PATENT DOCUMENTS

| JP | 48-59253 | 8/1973 |
|---|---|---|
| JP | 52-4967 | 1/1977 |
| JP | 57-171453 U | 4/1981 |
| JP | 61-89548 U | 6/1986 |
| JP | 63-297859 A | 12/1988 |
| JP | 4-95660 A | 3/1992 |
| JP | 5-263895 A | 10/1993 |
| JP | 10-317990 A | 12/1998 |

OTHER PUBLICATIONS

Akinori Yokoyama, Fluid Pressure Circuit for Hydraulic Power Transmission, Aug. 20, 1973 (Translation of JP 4859253 A).*
Mitsuaki Komatsu, Cooling Circuit for the Fluid Variable Speed Gear, Jan. 14, 1977 (Translation of JP 5204967 A).*

* cited by examiner

*Primary Examiner* — F. Daniel Lopez
(74) *Attorney, Agent, or Firm* — Global IP Counselors, LLP

(57) ABSTRACT

A fluid type power transmission system includes a fluid type power transmission device and a control part. The fluid type power transmission device includes an inlet part and an outlet part for a working fluid. The fluid type power transmission device is configured to transmit power in response to circulation of the working fluid in the interior thereof. The control part is configured to control a pressure of the working fluid in the inlet part by regulating a pressure of the working fluid in the outlet part of the fluid type power transmission device.

10 Claims, 9 Drawing Sheets

FLUID TYPE POWER TRANSMISSION SYSTEM

CROSS-REFERENCE TO RELATED APPLICATIONS

This national phase application claims priority to Japanese Patent Application No. 2007-281257, filed on Oct. 30, 2007 and Japanese Patent Application No. 2008-015586, filed on Jan. 25, 2008. The entire disclosures of Japanese Patent Application Nos. 2007-281257 and 2008-015586 are hereby incorporated herein by reference.

TECHNICAL FIELD

The present invention relates to a pressure regulation device for a fluid type power transmission device.

BACKGROUND ART

A torque converter and a fluid coupling are classified as fluid type power transmission devices to be used in vehicles.

The torque converter has a function of transmitting power in conjunction with circulation of working fluid filled in the interior of the torque converter. Further, the torque converter has a function of amplifying torque in accordance with a speed ratio.

The torque converter is normally composed of three kinds of blade wheels (i.e., impeller, turbine and stator). The impeller is coupled to a crankshaft of an engine, for instance. The turbine is opposed to the impeller while being coupled to an input shaft of a transmission, for instance. The turbine is driven by the flow of fluid from the impeller thereto. The stator is interposed between the inner periphery of the impeller and that of the turbine, for instance. The stator is supported by a fixed shaft extended from the transmission through a one-way clutch, for instance.

The working fluid is supplied to the interior of the torque converter from a hydraulic circuit and is then discharged from it. For example, the working fluid is supplied from a space between an impeller hub and the fixed shaft, and enters the torque converter from a space between the impeller and the stator. The working fluid subsequently gets out of the torque converter from a space between the turbine and the stator. Subsequently, the working fluid is discharged from a space between the fixed shaft and a transmission input shaft. The working fluid is used as the lubrication oil for the transmission after being discharged from the torque converter (see, e.g., Japanese Laid-Open Patent Publication No. JP-A-H05-263895).

Just the same as the torque converter, the fluid coupling has a function of transmitting power in conjunction with circulation of the working fluid filled in the interior thereof. However, the fluid coupling is not provided with a stator. Accordingly, the fluid coupling does not have a function of amplifying torque.

SUMMARY

FIG. 13 schematically exemplifies variation in inlet/outlet pressure of the torque converter when a speed ratio of the torque converter varies from 0 (i.e., engine stall state) to 1. Note the term "speed ratio" in the present specification refers to a ratio of the output revolution speed of the torque converter with respect to the input revolution speed thereof.

To stabilize a torque converter performance, the torque converter herein maintains the constant outlet pressure by connecting a relief valve to its outlet. As shown in FIG. 13, the inlet pressure is gradually reduced from the speed ratio 1 towards the speed ratio 0. In the torque converter, the inlet pressure is set to be low at the speed ratio roughly or completely equal to 1.0. Therefore, the inlet pressure is negative at the speed ratio roughly or completely equal to 0. When the inlet pressure is negative, cavitation occurs in the working fluid that circulates in the interior of the torque converter. Cavitation, occurring in the torque converter, causes a reduction in efficiency of the torque converter and erosion of the blade wheels.

The aforementioned case exemplifies that the inlet pressure is negative. However, it is not necessarily true that occurrence of cavitation can be inhibited unless the inlet pressure is negative. When the inlet pressure is low, even if it is not negative, cavitation may occur in the interior of the torque converter in some conditions.

The drawback is remarkable in the construction machines such as the wheel loaders that are often operated under the condition that the speed ratio of the torque converter is low. This is especially true for the situation that the outer diameter of the torque converter is large and the input revolution speed is high.

For example, the following countermeasure can be conceivable for solving the aforementioned drawback. In short, the set pressure of a relief valve connected to the outlet of the torque converter is set to be high. Accordingly, the inlet pressure of the torque converter can be kept to be high under the condition that the speed ratio is low. In this case, however, the inlet pressure will be higher than necessary under the condition that the speed ratio is high. The torque converter is thereby required to be strengthened for enduring the pressure. Further, it is necessary to deal with adverse effects such as increase in thrust load. Consequently, such drawbacks as increased cost and increased weight are produced.

Therefore, it is an important factor for designing the torque converter that each of the inlet pressure and the outlet pressure falls in a predetermined range.

As is obvious from the above explanation, the term "predetermined range" herein refers to a value range having a lower limit designed for preventing cavitation and an upper limit designed based on constraints such as strength and weight of the torque converter.

It is an object of the present invention to provide appropriate means for setting each of the inlet and outlet pressures of the fluid type power transmission device to fall in a predetermined range. In other words, it is an object of the present invention to inhibit both of the maximum inlet pressure and the maximum outlet pressure and simultaneously keep each of the minimum inlet pressure and the minimum outlet pressure to be equal to or greater than a predetermined required pressure.

An apparatus according to a first aspect of the present invention includes a fluid type power transmission device and a control part. The fluid type power transmission device includes an inlet part and an outlet part for a working fluid. The fluid type power transmission device is configured to transmit power in response to circulation of the working fluid in the interior thereof. The control part is configured to control a pressure of the working fluid in the inlet part by regulating a pressure of the working fluid in the outlet part of the fluid type power transmission device.

In the device, the control part is configured to regulate the pressure of the working fluid in the outlet part of the fluid type power transmission device to control the pressure of the working fluid in the inlet part. As a result, it is possible to inhibit the pressure of the working fluid in the inlet part of the fluid type power transmission device from being reduced to a predetermined required pressure or less.

The apparatus according to a second aspect of the present invention relates to the apparatus of the first aspect. In the apparatus, the control part is configured to regulate the pressure of the working fluid in the outlet part to prevent the pressure of the working fluid in the inlet part of the fluid type power transmission device from being equal to or less than a predetermined value.

In the device, the pressure of the working fluid in the inlet part of the fluid type power transmission device is prevented from being equal to or less than a predetermined required pressure.

The apparatus according to a third aspect of the present invention relates to the apparatus of the first aspect. In the apparatus, the control part includes a rotation speed detection part that is configured and arranged to detect an input rotation speed and an output rotation speed of the fluid type power transmission device. Additionally, the control part is configured to regulate the pressure of the working fluid in the outlet part of the fluid type power transmission device in accordance with a speed ratio.

In the device, the speed detection part detects the input rotation speed and the output rotation speed of the fluid type power transmission device, whereas the control part regulates the pressure of the working fluid in the outlet part of the fluid type power transmission device in accordance with the speed ratio. Accordingly, the pressure of the working fluid in the inlet part of the fluid type power transmission device is finally controlled in accordance with the speed ratio. Consequently, it is possible to prevent the pressure of the working fluid in the inlet part from being equal to or less than a predetermined required pressure.

The apparatus according to a fourth aspect of the present invention relates to the apparatus of the third aspect. In the apparatus, the control part is configured to increase the pressure of the working fluid in the outlet part of the fluid type power transmission device in proportion to a reduction in the speed ratio of the fluid type power transmission device.

In the device, the pressure of the working fluid in the outlet part increases in proportion to the reduction in the speed ratio. Consequently, a value of the pressure of the working fluid in the inlet part gets higher than that of the conventional art in proportion to an increase in the pressure of the working fluid in the outlet part. Therefore, it is possible to inhibit the pressure of the working fluid in the inlet part to be equal to or less than a predetermined required pressure when the speed ratio is equal to or roughly 0.

The apparatus according to a fifth aspect of the present invention relates to the apparatus of the third aspect. In the apparatus, the control part includes an outlet relief valve, a control valve and a controller. The outlet relief valve is connected to the outlet part of the fluid type power transmission device. The control valve is configured to control a relief pressure of the outlet relief valve. The controller is configured to control the control valve in accordance with the speed ratio.

In the device, the controller controls the control valve using an electric signal in accordance with the speed ratio, whereas the control valve controls the relief pressure of the outlet relief valve. Consequently, the pressure of the working fluid in the outlet part of the fluid type power transmission device is regulated. In other words, the pressure of the working fluid in the inlet part of the fluid type power transmission device is finally controlled in accordance with the speed ratio. Consequently, it is possible to prevent the pressure of the working fluid in the inlet part from being equal to or less than a predetermined required pressure.

The apparatus according to a sixth aspect of the present invention relates to the apparatus of the first aspect. In the apparatus, the control part includes a rotation speed detection part configured and arranged to detect an input rotation speed and an output rotation speed of the fluid type power transmission device. The control part is configured to regulate the pressure of the working fluid in the outlet part of the fluid type power transmission device in accordance with both of the input rotation speed and the speed ratio.

The device is configured to regulate the pressure of the working fluid in the outlet part of the fluid type power transmission device in response to not only the speed ratio but also the input rotation speed. As a result, the pressure of the working fluid in the inlet part of the fluid type power transmission device is finally further appropriately controlled not to be equal to or less than a predetermined required pressure in response to the speed ratio and the input rotation speed.

The apparatus according to a seventh aspect of the present invention relates to the apparatus of the sixth aspect. In the apparatus, the control part is configured to increase the pressure of the working fluid in the outlet part of the fluid type power transmission device in proportion to a reduction in the speed ratio of the fluid type power transmission device. The control part is further configured to regulate increase in the pressure of the working fluid in the outlet part in accordance with the input rotation speed.

The device is configured to increase the pressure of the working fluid in the outlet part increases in proportion to a reduction in the speed ratio. Further, the pressure of the working fluid in the outlet part is increased to an appropriate value in accordance with the input rotation speed. As a result, the pressure of the working fluid in the inlet part is further appropriately controlled not to be equal to or less than a predetermined required pressure.

The apparatus according to an eighth aspect of the present invention relates to the apparatus of the sixth aspect. In the apparatus, the control part includes an output relief valve, a control valve and a controller. The outlet relief valve is connected to the outlet part of the fluid type power transmission device. The control valve is configured to control a relief pressure of the outlet relief valve. The controller is configured to control the control valve in accordance with the speed ratio. The controller is configured to control the control valve using an electric signal in accordance with both of the input rotation speed and the speed ratio, whereas the control valve is configured to control the relief pressure of the outlet relief valve. As a result, the pressure of the working fluid in the inlet part of the fluid type power transmission device is further appropriately controlled not to be equal to or less than a predetermined required pressure in accordance with both of the speed ratio and the input rotation speed.

The apparatus according to a ninth aspect of the present invention relates to the apparatus of the first aspect. In the apparatus, the control part includes an inlet pressure detection part for detecting the pressure of the working fluid in the inlet part of the fluid type power transmission device. The control part regulates the pressure of the working fluid in the outlet part of the fluid type power transmission device in accordance with the pressure of the working fluid in the inlet part of the fluid type power transmission device.

In the device, the inlet pressure detection part detects the pressure of the inlet part of the fluid type power transmission device, whereas the control part regulates the pressure of the outlet part of the fluid type power transmission device in accordance with the pressure of the inlet part. Accordingly, the pressure of the inlet part is feedback-controlled through the pressure of the outlet part. Consequently, it is possible to prevent the pressure of the inlet part from being equal to or less than a predetermined required pressure.

The apparatus according to a tenth aspect of the present invention relates to the apparatus of the ninth aspect. In the apparatus, the control is configured to increase the pressure of the working fluid in the outlet part of the fluid type power transmission device when the pressure of the working fluid in the inlet part of the fluid type power transmission device decreases.

The device is configured to increase the pressure of the working fluid in the outlet part when the pressure of the working fluid in the inlet part decreases. Accordingly, a value of the pressure of the working fluid in the inlet part becomes higher than that of the conventional art in conjunction with increase in the pressure of the working fluid in the outlet part. Consequently, it is possible to inhibit the pressure of the working fluid in the inlet part from being equal to or less than a predetermined required pressure.

The apparatus according to an eleventh aspect of the present invention relates to the apparatus of the ninth aspect. In the apparatus, the control part includes an outlet relief valve, a control valve, and a controller. The outlet relief valve is connected to the outlet part of the fluid type power transmission device. The control valve is configured to control a relief pressure of the outlet relief valve. The controller is configured to control the control valve in accordance with the pressure of the working fluid in the inlet part of the fluid type power transmission device.

In the device, the controller controls the control valve using an electric signal in accordance with the pressure of the working fluid in the inlet part, whereas the control valve controls the relief pressure of the outlet relief valve. Accordingly, the pressure of the working fluid in the outlet part of the fluid type power transmission device is controlled. In other words, the pressure of the working fluid in the inlet part is feedback-controlled by the controller through the pressure of the working fluid in the outlet part. Consequently, it is possible to prevent the pressure of the working fluid in the inlet part from being equal to or less than a predetermined required pressure. Further, it is possible to maintain the pressure of the working fluid in the inlet part to fall in a predetermined required pressure range.

The apparatus according to a twelfth aspect of the present invention relates to the apparatus of the ninth aspect. In the apparatus, the control part includes an outlet relief valve connected to the outlet part of the fluid type power transmission device. The outlet relief valve is configured to regulate a relief pressure in accordance with the pressure of the working fluid in the inlet part of the fluid type power transmission device. The outlet relief valve is also configured to increase the relief pressure when the pressure of the working fluid in the inlet part of the fluid type power transmission device decreases.

In the device, the outlet relief valve is configured to increase the pressure of the working fluid in the outlet part when the pressure of the working fluid in the inlet part of the fluid type power transmission device decreases. Consequently, it is possible to prevent the pressure of the working fluid in the inlet part of the fluid type power transmission device from being equal to or less than a predetermined required pressure.

The apparatus according to a thirteenth aspect of the present invention relates to the apparatus of the first aspect. In the apparatus, the control part includes a comparison part configured to compare the pressure of the working fluid in the inlet part of the fluid type power transmission device and the pressure of the working fluid in the outlet part thereof. The control part is configured to regulate the pressure of the working fluid in the outlet part of the fluid type power transmission device in accordance with a result of the comparison between the pressure of the working fluid in the inlet part and the pressure of the working fluid in the outlet part.

In the device, the comparison part compares the pressure of the working fluid in the inlet part of the fluid type power transmission device and the pressure of the working fluid in the outlet part thereof, whereas the control part regulates the pressure of the working fluid in the outlet part of the fluid type power transmission device in accordance with a result of the comparison between the pressure of the working fluid in the inlet part and the pressure of the working fluid in the outlet part. In other words, the pressure of the working fluid in the inlet part of the fluid type power transmission device is finally controlled in accordance with a result of the comparison between the pressure of the working fluid in the inlet part and the pressure of the working fluid in the outlet part. Consequently, it is possible to inhibit the pressure of the working fluid in the inlet part from being equal to or less than a predetermined required pressure.

The apparatus according to a fourteenth aspect of the present invention relates to the apparatus of the thirteenth aspect. In the apparatus, the control part includes an outlet relief valve connected to the outlet part of the fluid type power transmission device. When the pressure of the working fluid in the inlet part of the fluid type power transmission device becomes lower than the pressure of the working fluid in the outlet part thereof, the outlet relief valve is configured to regulate the relief pressure in accordance with a difference between the pressure of the working fluid in the inlet part and the pressure of the working fluid in the outlet part. Further, the outlet relief valve is configured to increase the relief pressure in proportion to an increase in the difference between the pressure of the working fluid in the inlet part and the pressure of the working fluid in the outlet part.

The pressure of the working fluid in the inlet part is higher than that of the outlet part under the condition that the speed ratio is high. In some cases, however, the pressure of the working fluid in the inlet part decreases in proportion to a reduction in the speed ratio, and the pressure of the working fluid in the inlet part gets lower than that of the outlet part under the condition that the speed ratio is low. In such cases, the device is configured to maintain the pressure of the working fluid in the outlet part to be constant under the condition that the speed ratio is high, just like the conventional art. On the other hand, the control part is configured to increase the pressure of the working fluid in the outlet part in accordance with a difference between the pressure of the working fluid in the outlet part and that of the inlet part under the condition that the speed ratio is low. Consequently, the pressure of the working fluid in the outlet part increases in proportion to a reduction in the speed ratio under the condition that the speed ratio is low. In other words, the pressure of the working fluid in the inlet part of the fluid type power transmission device is controlled in accordance with a result of the comparison between the pressure of the working fluid in the inlet part and that of the outlet part. Thus, it is possible to inhibit the pressure of the working fluid in the inlet part from being reduced to be a predetermined required pressure or less.

The apparatus according to a fifteenth aspect of the present invention relates to the apparatus of the thirteenth aspect. In the apparatus, the control part includes an outlet relief valve, a control valve, and a controller. The outlet relief valve is connected to the outlet of the fluid type power transmission device. The control valve is configured to control a relief pressure of the outlet relief valve. The controller controls the control valve in accordance with a result of the comparison between the pressure of the working fluid in the inlet part of the fluid type power transmission device and the pressure of the working fluid in the outlet part of thereof.

In the device, when the pressure of the working fluid in the inlet part of the fluid type power transmission device gets lower than that of the outlet part thereof, the controller controls the control valve using an electric signal in accordance with the difference between the pressure of the working fluid in the inlet part and that of the outlet part. Accordingly, the control valve controls the relief pressure of the outlet relief valve. The controller is configured to increase the relief pressure of the outlet relief valve through the control valve when the pressure of the working fluid in the inlet part is lower than that of the outlet part and a difference between them gets larger. In other words, the pressure of the working fluid in the inlet part is controlled by the controller in accordance with a difference between the pressure of the working fluid in the inlet part and that of the outlet part. Consequently, it is possible to prevent the pressure of the working fluid in the inlet part from being equal to or less than a predetermined required pressure.

The apparatus according to a sixteenth aspect of the present invention relates to the apparatus of the thirteenth aspect. In the apparatus, the comparison part includes an inlet-outlet pressure difference detection piston. The control part includes an outlet relief valve connected to the outlet part of the fluid type power transmission device. The outlet relief valve includes a valve and a spring for setting the relief pressure. The inlet-outlet difference detection piston is configured to compress the spring for increasing the load applied to the valve by the spring when the pressure of the working fluid in the inlet part gets lower than the pressure of the working fluid in the outlet part. Accordingly, the relief pressure of the outlet relief valve is increased.

In the device, the relief pressure of the outlet relief valve is increased by the actions of the inlet-outlet pressure difference detection piston and the spring when the pressure of the working fluid in the inlet part gets lower than that of the outlet part. Accordingly, the pressure of the working fluid in the outlet part of the fluid type power transmission device is increased. The pressure of the working fluid in the inlet part of the fluid type power transmission device increases in proportion to increase in the pressure of the working fluid in the outlet part thereof. Consequently, the inlet-outlet pressure difference detection piston is held at a position where a balance is produced between the load of the spring and the load applied by the difference between the pressure of the working fluid in the inlet part and that of the outlet part.

When the difference between the pressure of the working fluid in the inlet part and that of the outlet part gets larger, the inlet-outlet pressure difference detection piston further compresses the spring. Accordingly, the relief pressure of the outlet relief valve is further increased.

Based on the above, the pressure of the working fluid in the inlet part of the fluid type power transmission device is controlled in accordance with a result of the comparison between the pressure of the working fluid in the inlet part and that of the outlet part, which is detected by the inlet-outlet pressure difference detection piston. Consequently, it is possible to inhibit the pressure of the working fluid in the inlet part from being reduced to a predetermined required pressure or less.

In the apparatus according to the above aspects, it is possible to inhibit increase in the inlet pressure and increase in the outlet pressure under the condition that the speed ratio in the fluid type power transmission device is high. Simultaneously, it is possible to inhibit the pressure of the working fluid in the inlet part from being reduced to a predetermined required pressure or less under the condition that the speed ratio is low.

DETAILED DESCRIPTION OF THE EMBODIMENTS

1. Composition of Wheel Loader 50

Figure 1:
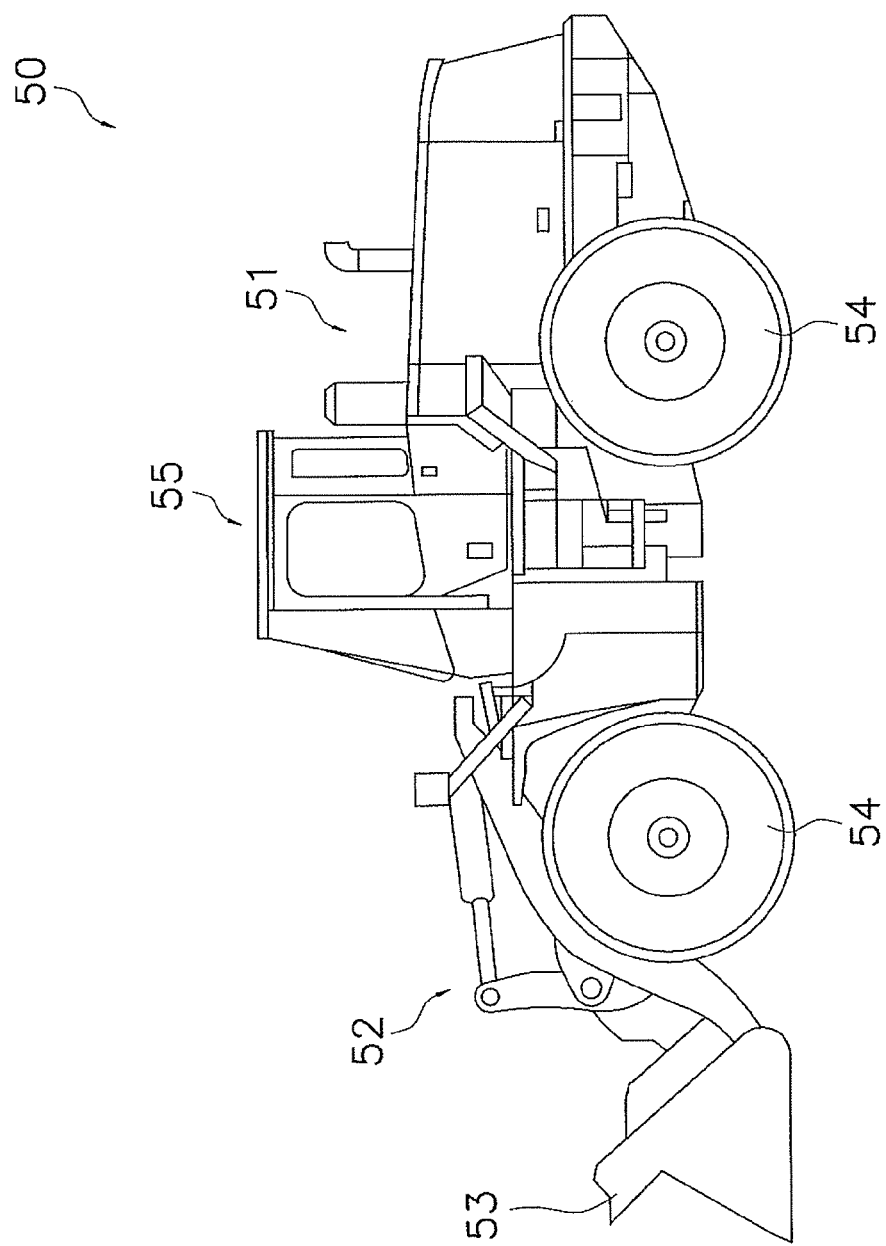
FIG. 1 is a side view of a wheel loader that an embodiment of the present invention is adopted.

As illustrated in FIG. 1, a wheel loader 50 according to an embodiment of the present invention is composed of a vehicle body 51, a lift arm 52, a bucket 53, four tires 54 and a cab 55. The lift arm 52 is attached to the front part of the vehicle body 51. The bucket 53 is attached to the tip of the lift arm 52. The tires 54 rotate while supporting the vehicle body 51 for moving the vehicle body 51. The cab 55 is mounted on the top of the vehicle body 51.

The vehicle body 51 is composed of an engine compartment and a controller. The engine compartment accommodates an engine 61 (see FIG. 2). The controller controls a variety of components (e.g., control valves and actuators) for driving the lift arm 52 and the bucket 53.

The lift arm 52 is an arm member for raising the bucket 53 attached to its tip. The lift arm 52 is driven by a lift cylinder that is provided therewith.

The bucket 53 is attached to the tip of the lift arm 52. The bucket 53 is configured to be faced down and tilted by a bucket cylinder.

The cab 55 is equipped with the ROPS (roll over protective structure), and functions as an operator's cab formed by a combination of a plurality of steel pipes and steel plates.

2. Internal Composition of Wheel Loader 50

Figure 2:
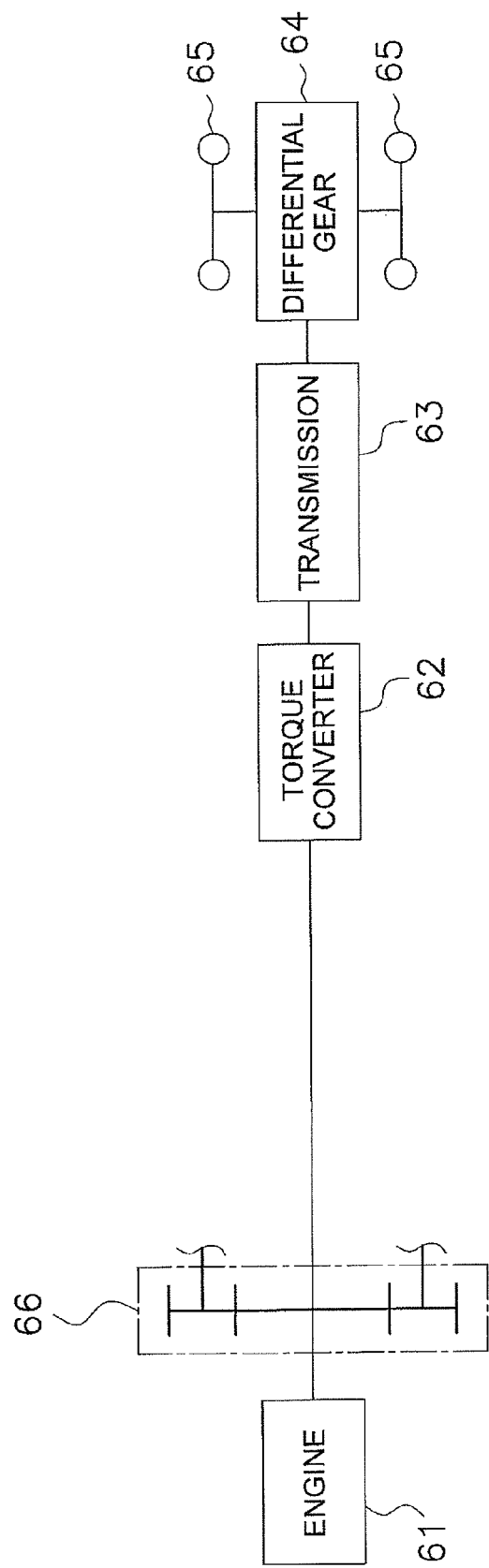
FIG. 2 is a schematic diagram of a carrier mechanism of a wheel loader that an embodiment of the present invention is adopted.

As illustrated in FIG. 2, the wheel loader 50 mainly accommodates the engine 61, a carrier mechanism, a work implement mechanism, and an engine load control device. The carrier mechanism and the work implement mechanism are driven by the engine 61. The engine load control device includes a controller for controlling the mechanisms and the like.

The carrier mechanism includes a torque converter 62, a transmission 63, a differential gear 64 and driving wheels 65. Output of the engine 61 is inputted into the torque converter 62. The transmission 63 is coupled to the torque converter 62. The differential gear 64 is coupled to an output shaft of the transmission 63. The transmission 63 includes a forward hydraulic clutch, a reverse hydraulic clutch, a plurality of speed shift clutches and the like. Speed shifting and switching between forward and reverse travel are executed by the On/Off controls of the clutches.

The wheel loader 50 mainly includes a steering mechanism (not illustrated in the figure), loaders (e.g., lift arm 52 and bucket 53 provided in the front part of the vehicle body) and fans (not illustrated in the figure) as the mechanisms to be driven by the engine 61 excluding the carrier mechanism.

To drive the mechanisms, a plurality of hydraulic pumps are coupled to the engine 61 through a PTO mechanism 66.

3. Pressure regulation Device for Fluid Type Power Transmission Device

First Embodiment

Figure 3:
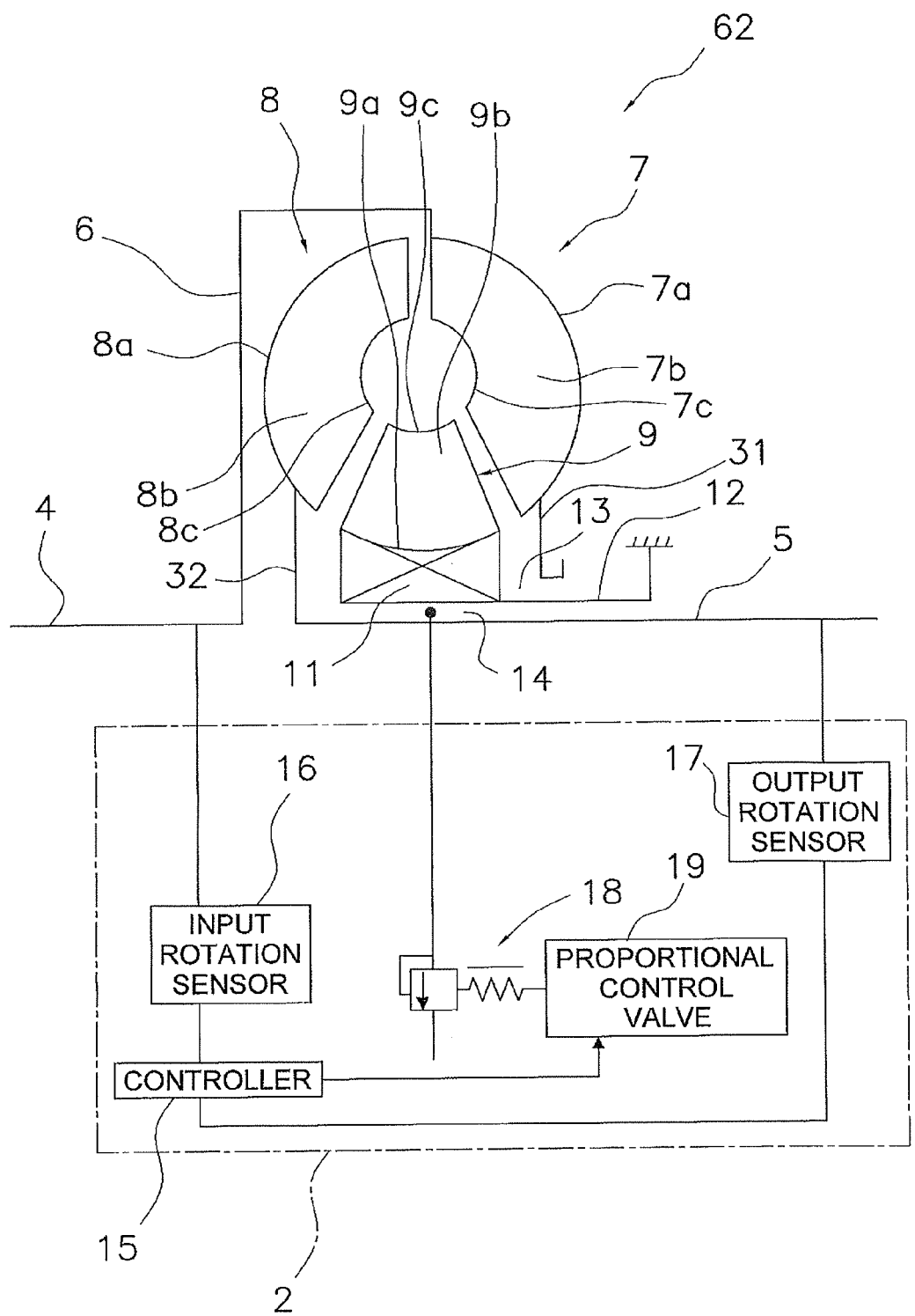
FIG. 3 is a schematic diagram of a pressure regulation device for a torque converter according to a first embodiment of the present invention.

FIG. 3 illustrates a schematic diagram of a pressure regulation device for a fluid type power transmission device according to an embodiment of the present invention. The device is mainly composed of the torque converter 62 and control part 2.

(1) Torque Converter

The torque converter 62 is a fluid power transmission device for transmitting power by part of working fluid. The torque converter 62 is disposed between a crankshaft 4 of the engine and an input shaft 5 of the transmission 63. The torque converter 62 forms a fluid chamber by a front cover 6 and an impeller 7. The inner periphery of the front cover 6 is fixed to the crankshaft 4, whereas the outer periphery thereof is fixed to the outer periphery of the impeller 7. The torque converter 62 accommodates the impeller 7, a turbine 8 and a stator 9 in its fluid chamber. When the working fluid circulates in the interior of the torque converter 62, power is transmitted from the impeller 7 to the turbine 8.

More specifically, the impeller 7 is composed of an impeller shell 7a, an impeller core 7c and a plurality of impeller blades 7b fixed to the impeller shell 7a and the impeller core 7c. The turbine 8 is composed of a turbine shell 8a, a turbine core 8c and a plurality of turbine blades 8b fixed to the turbine shell 8a and the turbine core 8c. The inner periphery of the turbine shell 8a is coupled to the input shaft 5 of the transmission 63 through a turbine hub 32. The stator 9 is composed of a stator shell 9a, a stator core 9c and a plurality of stator blades 9b fixed to the stator shell 9a and the stator core 9c. The stator shell 9a is supported by a fixed shaft 12 through a one-way clutch 11. The fixed shaft 12 is formed in a tubular shape. The fixed shaft 12 is fixed to the wall of the transmission 63. The fixed shaft 12 is disposed around the input shaft 5 of the transmission 63.

The hydraulic circuit (not illustrated in the figure) feeds the working fluid into the torque converter 62, and further recovers the working fluid from the torque converter 62. Specifically, the working fluid is supplied from a space between an impeller hub 31 and the fixed shaft 12, and flows into the torque converter 62 from an inlet 13 (inlet part) formed between the impeller 7 and the stator 9. Furthermore, the working fluid flows out of the torque converter 62 from a space between the turbine 8 and the stator 9. The working fluid is then discharged from an outlet 14 (outlet part) formed between the fixed shaft 12 and the input shaft 5 of the transmission 63.

The working fluid flows from the impeller 7 towards the turbine 8 in the interior of the torque converter 62. Flow of the working fluid rotates the turbine 8. Next, the working fluid returns to the impeller 7 from the turbine 8 via the stator 9. In this case, a flow direction of the working fluid is changed by the stator 9, and the working fluid then returns to the impeller 7.

(2) Control Part

The control part 2 is configured to control the inlet pressure (the pressure of the working fluid in the inlet) of the torque converter 62 by regulating the outlet pressure (the pressure of the working fluid in the outlet) of the torque converter 62. More specifically, a relief valve 18 is connected to the outlet 14 of the torque converter 62. Other components of the control part 2 are configured to control the outlet pressure by operating the relief valve 18.

The control part 2 includes a controller 15, an input rotation sensor 16, an output rotation sensor 17, the relief valve 18 and a proportional control valve 19. The input rotation sensor 16 detects the rotation speed of the crankshaft 4 of the engine. The output rotation sensor 17 detects the rotation speed of the input shaft 5 of the transmission 63. The relief valve 18 regulates the pressure of the outlet 14 for setting it to be roughly equal to a set pressure. Specifically, the relief valve 18 is configured to be closed for increasing the pressure of the outlet 14 when the pressure of the outlet 14 is equal to or less than the set pressure. On the other hand, the relief valve 18 is configured to be opened for relieving the pressure through a relief port when the pressure of the outlet 14 is equal to or greater than the set pressure. The proportional control valve 19 receives a control signal from the controller 15 and controls the set pressure of the relief valve 18 in response to the control signal. The controller 15 receives an input rotation speed signal from the input rotation sensor 16, and further receives an output rotation speed signal from the output rotation sensor 17. The controller 15 further computes a speed ratio (i.e., a value computed by dividing the rotation speed of the output shaft by the rotation speed of the input shaft). The controller 15 is configured to transmit an appropriate control signal to the proportional control valve 19 in accordance with the speed ratio or in accordance with the input rotation speed signal and the speed ratio.

(3) Control Actions

The controller 15 receives an input rotation speed signal from the input rotation sensor 16. Additionally, the controller 15 computes a speed ratio based on the input rotation speed signal that it received from the input rotation sensor 16 and the output rotation speed signal that it received from the output rotation sensor 17. The controller 15 is configured to transmit an appropriate control signal to the proportional control valve 19 in accordance with the speed ratio or in accordance with the input rotation speed signal and the speed ratio.

The proportional control valve 19 controls the set pressure of the relief valve 18 in accordance with the control signal that it received from the controller 15.

The relief valve 18 regulates the pressure of the outlet 14 for setting it to be the same as the pressure set by the proportional control valve 19.

Figure 4:
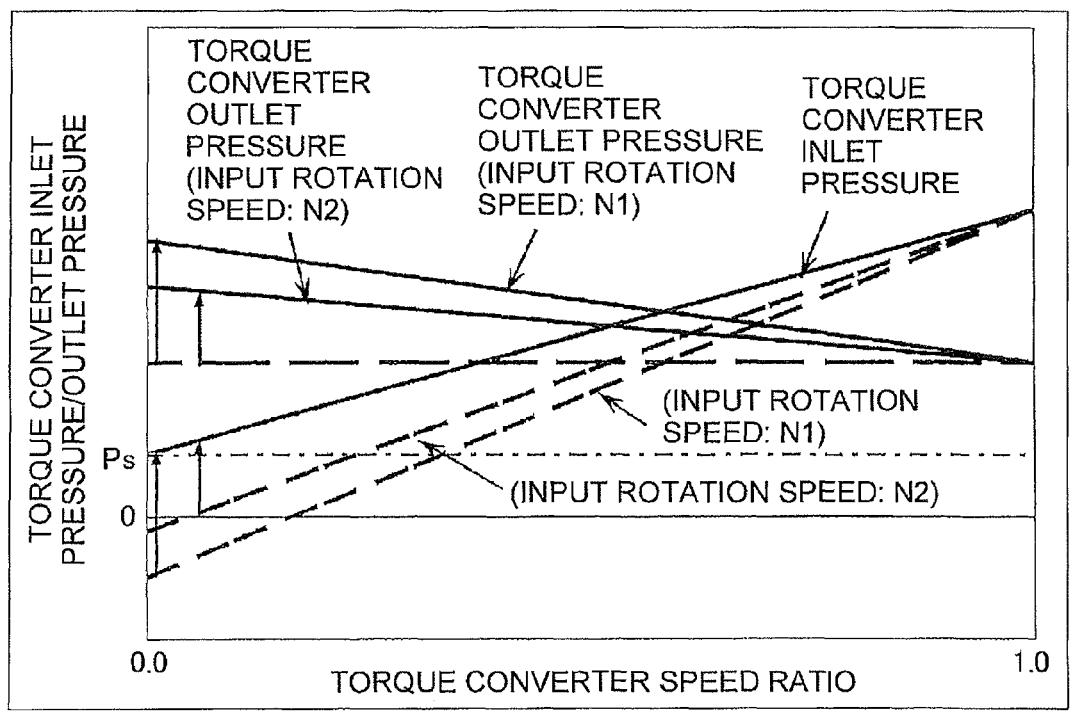
FIG. 4 is a schematic chart for exemplifying variation in inlet/outlet pressure of the torque converter with respect to a speed ratio of the torque converter in the application of a first embodiment of the present invention.

FIG. 4 shows an example that the outlet pressure is controlled to gradually increase in proportion to reduction in the speed ratio of the torque converter from 1 to 0. Note FIG. 4 is an example schematic chart showing variation in the inlet pressure and the outlet pressure of the torque converter with respect to the speed ratio of the torque converter. In the chart, the inlet pressure and the outlet pressure of the present embodiment are illustrated with solid lines whereas those of the conventional art are illustrated with dashed lines.

The inlet pressure gradually decreases in proportion to a reduction in the speed ratio of the torque converter from 1 to 0. However, the inlet pressure of the present embodiment is higher than that of the conventional art in the entire range from 0 to 1 of the speed ratio of the torque converter. As described above, the reason is that the outlet pressure of the present embodiment is not constant unlike the conventional art and it is controlled to increase in proportion to a reduction in the speed ratio.

Variation in the inlet pressure of the torque converter with respect to the speed ratio of the torque converter depends on the input rotation speed. However, the controller 15 has a function of transmitting an appropriate control signal to the proportional control valve 19 not only in accordance with the speed ratio but also in accordance with the input rotation speed signal.

The chart of FIG. 4 simultaneously shows output pressure lines at different input rotation speeds N1, N2. The output pressure lines at the input rotation speeds N1, N2 are different from each other. This is because the controller 15 transmits a different control signal to the proportional control valve 19 in accordance with the input rotation speed signal.

The controller 15 is programmed to transmit an appropriate control signal to the proportional control valve 19 at all the input rotation speeds and all the speed ratios at which the torque converter is operated.

As a result, the input pressure is maintained to be higher than a predetermined required pressure (illustrated by Ps in FIG. 4).

It is thereby possible to inhibit cavitation to be caused by reduction in the inlet pressure and prevent drawbacks such as degradation in performance of the torque converter 62 and erosion of the blade wheels. Additionally, the inlet pressure of the torque converter in the present embodiment is the same as that in the conventional art under the condition that the speed ratio is high. It is thereby possible to reduce drawbacks such as increase in weight.

(4) Advantageous Effects of First Embodiment (a) According to the device, the control part 2 regulates the outlet pressure of the torque converter 62 for controlling the inlet pressure. Therefore, the inlet pressure of the torque converter 62 can be relatively freely controlled. Accordingly, it is possible to inhibit reduction in the inlet pressure of the torque converter 62. In the present embodiment, it is possible to keep the inlet pressure of the torque converter 62 to be higher than a predetermined required pressure. As a result, cavitation does not easily occur in the working fluid. It is thereby possible to prevent degradation in performance of the torque converter 62 and erosion of the blade wheels.

(b) The pressure regulation device of the fluid type power transmission device further includes the input rotation sensor 16 and the output rotation sensor 17 for detecting the input rotation speed and the output rotation speed of the torque converter 62. The control part 2 regulates the outlet pressure of the torque converter 62 in accordance with the speed ratio or in accordance with the input rotation speed and the speed ratio.

In the device, the input rotation sensor 16 detects the input rotation speed of the torque converter 62, whereas the output rotation sensor 17 detects the output rotation speed of the torque converter 62. The control part 2 then regulates the outlet pressure of the torque converter 62 in accordance with the speed ratio to be obtained by both rotation speeds or in accordance with the input rotation speed and the speed ratio. In short, the input pressure of the torque converter 62 is controlled to be equal to or greater than a predetermined required pressure in accordance with the speed ratio or in accordance with the input rotation speed and the speed ratio.

(c) The control part 2 is configured to increase the outlet pressure of the torque converter 62 in proportion to a reduction in the speed ratio. Consequently, a value of the inlet pressure will be higher than that in the conventional art in proportion to an increase in the outlet pressure. Further, the control part 2 controls increase in the outlet pressure in accordance with the input rotation speed and the speed ratio.

More specifically, when the speed ratio is equal to or roughly 0, the inlet pressure can be set to be higher than a predetermined required pressure without being extremely low.

(d) The control part 2 includes the outlet relief valve 18, the proportional control valve 19 and the controller 15. The outlet relief valve 18 is connected to the outlet 14 of the torque converter 62. The proportional control valve 19 can control the relief pressure of the outlet relief valve 18. The controller 15 controls the proportional control valve 19 in accordance with the speed ratio or in accordance with the input rotation speed and the speed ratio. In the device, the controller 15 controls the proportional control valve 19 by an electric signal in accordance with the speed ratio or in accordance with the input rotation speed and the speed ratio. Further, the proportional control valve 19 controls the relief pressure of the outlet relief valve 18. The outlet pressure of the torque converter 62 is thereby controlled. Consequently, the inlet pressure of the torque converter 62 is controlled to be equal to or greater than a predetermined required pressure in accordance with the speed ratio or in accordance with the input rotation speed and the speed ratio.

4. Pressure Regulation Device of Fluid Type Power Transmission Device

Second Embodiment

Figure 5:
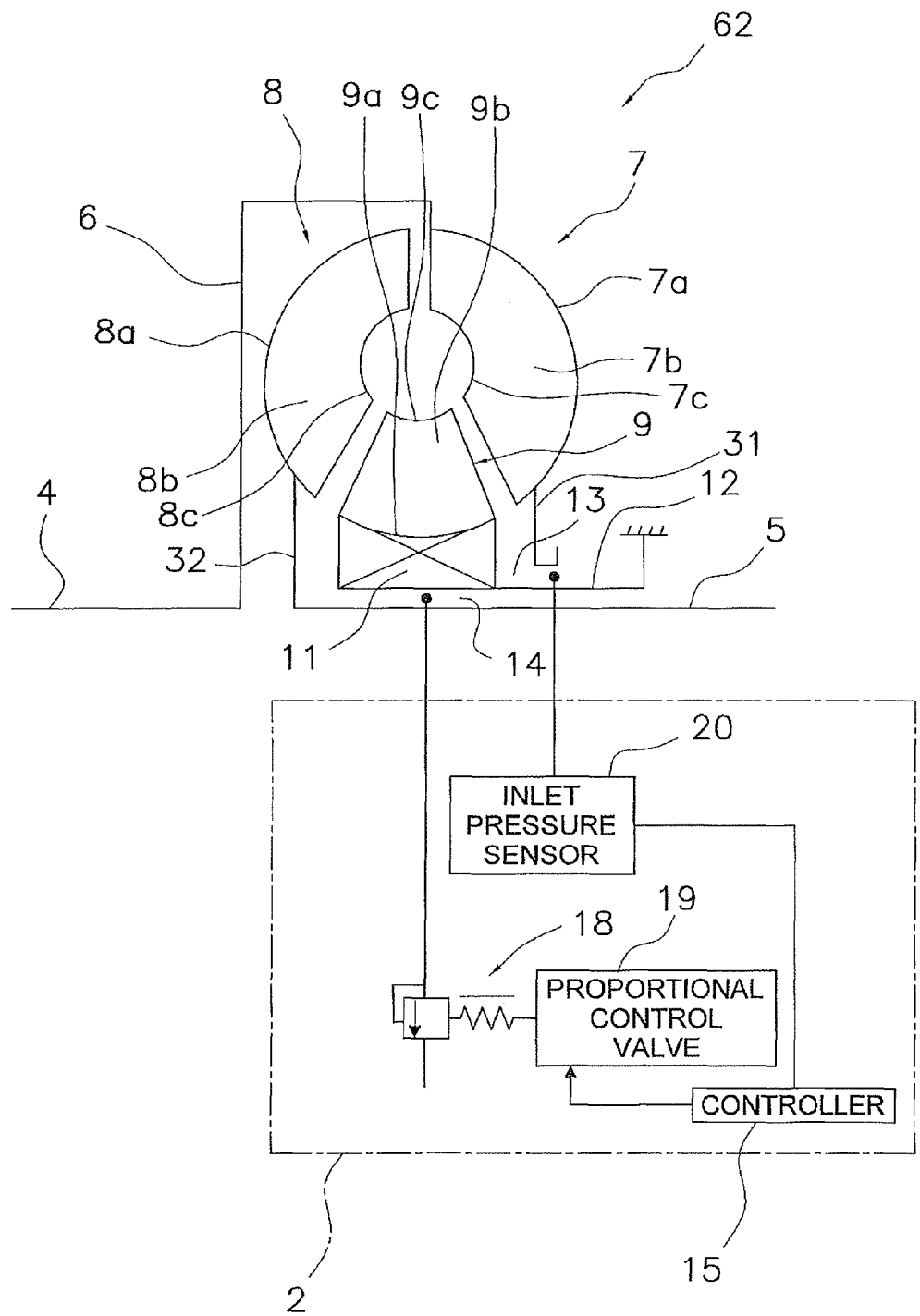
FIG. 5 is a schematic diagram of a pressure regulation device for a torque converter according to a second embodiment of the present invention.

FIG. 5 illustrates a schematic diagram of a pressure regulation device of a fluid type power transmission device as an embodiment of the present invention. The device is mainly composed of the torque converter 62 and the control part 2.

(1) Torque Converter

The torque converter 62 of the present embodiment has the same composition as that of the first embodiment.

(2) Control Part

The control part 2 is configured to control the inlet pressure of the torque converter 62 by regulating the outlet pressure of the torque converter 62. More specifically, the relief valve 18 is connected to the working fluid outlet 14 of the torque converter 62. Other components of the control part 2 control the outlet pressure by operating the relief valve 18.

The control part 2 includes the controller 15, an inlet pressure sensor 20, and the proportional control valve 19. The inlet pressure sensor 20 detects the inlet pressure of the torque converter 62. The relief valve 18 regulates the pressure of the working fluid outlet 14 for setting it to be roughly equal to a set pressure. Specifically, the relief valve 18 is configured to be closed for increasing the pressure of the working fluid outlet 14 when the pressure of the working fluid outlet 14 is equal to or less than the set pressure. On the other hand, the relief valve 18 is configured to be opened for relieving the pressure through the relief port when the pressure of the working fluid outlet 14 is equal to or greater than the set pressure. The proportional control valve 19 receives a control signal from the controller 15 and controls the set pressure of the relief valve 18 in response to the control signal. The controller 15 receives an inlet pressure signal from the inlet pressure sensor 20. Further, the controller 15 transmits a control signal to the proportional control valve 19 in accordance with the inlet pressure.

(3) Control Actions

Figure 6:
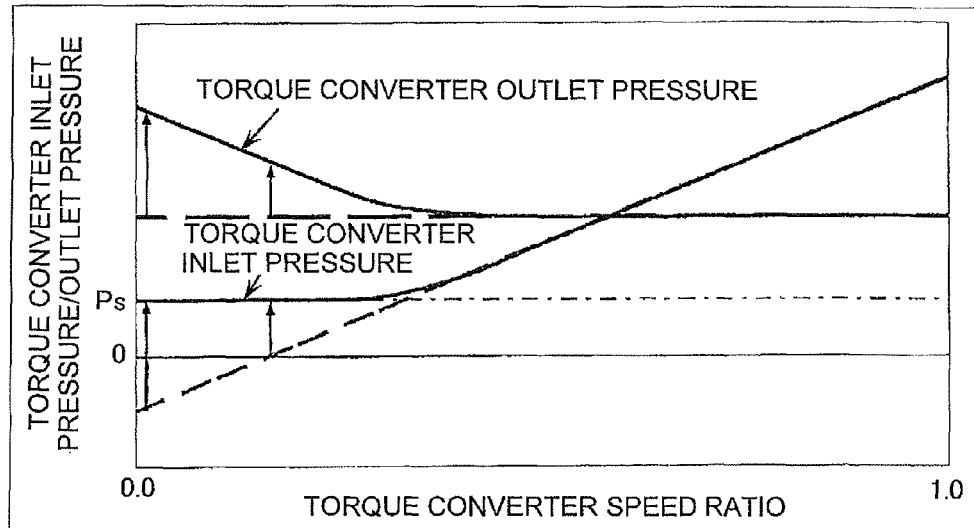
FIG. 6 is a schematic chart for exemplifying variation in the inlet/outlet pressure of the torque converter with respect to the speed ratio of the torque converter in the application of a second embodiment of the present invention.

FIG. 6 shows a schematic example of variation in the inlet pressure and the outlet pressure of the torque converter with respect to the torque converter speed ratio in the present embodiment. The inlet pressure and the outlet pressure of the present embodiment are shown with solid lines whereas those of the conventional art are shown with dashed lines. In the present embodiment, the outlet pressure increases in proportion to a reduction in the speed ratio under the condition that the speed ratio is low. On the other hand, the inlet pressure is roughly constant under the condition that the speed ratio is low. More specifically, the inlet pressure is maintained to be equal to or greater than a predetermined required pressure.

Figure 7:
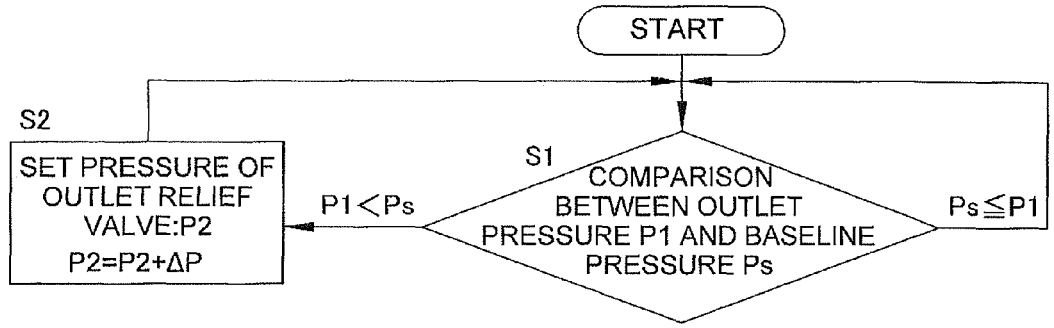
FIG. 7 is a flowchart of a control action of a controller in the second embodiment of the present invention.

FIG. 7 illustrates a flowchart of control actions by the controller 15 of the present embodiment.

In Step S1 of FIG. 7, the controller 15 compares an inlet pressure P1 with a baseline pressure Ps. When it is determined that P1 is less than Ps (P1<Ps) in Step S1, the controller 15 transmits an electric signal to the proportional control valve 19 for causing it to increase a set pressure P2 of the relief valve 18 by ΔP in Step S2.

When the set pressure P2 of the relief valve 18 is increased by ΔP, the outlet pressure is also increased by ΔP. Accordingly, the inlet pressure is also increased.

The aforementioned steps are repeated until the inlet pressure P1 satisfies a condition "Ps≤P1". As a result, the inlet pressure P1 is prevented from being lower than a predetermined required pressure (in the present example, specifically, the baseline pressure Ps) in the entire range of the speed ratio of the torque converter.

Therefore, it is possible to inhibit cavitation in the working fluid to be caused by reduction in the inlet pressure and prevent drawbacks such as degradation in performance of the torque converter 62 and erosion of the blade wheels. Further in the present embodiment, it is possible to set the inlet pressure of the torque converter to be roughly the same as that in the conventional art under the condition that the speed ratio is high. Therefore, it is possible to relieve the drawbacks such as increase in weight of the torque converter.

(4) Advantageous Effects of Second Embodiment (a) In the device, the control part 2 regulates the outlet pressure of the torque converter 62 for controlling the inlet pressure. Accordingly, the inlet pressure of the torque converter 62 can be relatively freely controlled. Therefore, it is possible to inhibit reduction in the inlet pressure of the torque converter 62. In the present embodiment, it is possible to keep the inlet pressure of the torque converter 62 to be higher than a predetermined required pressure. As a result, cavitation does not easily occur in the working fluid. Further, it is possible to prevent degradation in performance of the torque converter 62 and erosion of the blade wheels.

(b) The pressure regulation device of the fluid type power transmission device further includes the inlet pressure sensor 20 for detecting the inlet pressure of the torque converter 62. The control part 2 regulates the outlet pressure of the torque converter 62 in accordance with the inlet pressure of the torque converter 62.

In the device, the inlet pressure sensor 20 detects the inlet pressure of the torque converter 62, and the control part 2 regulates the outlet pressure of the torque converter 62 in accordance with the inlet pressure of the torque converter 62. Consequently, the inlet pressure of the torque converter 62 is feedback-controlled through the outlet pressure of the torque converter 62. It is thereby possible to prevent the inlet pressure from being reduced to a predetermined required pressure or less.

(c) The control part 2 regulates the outlet pressure of the torque converter 62 for maintaining the inlet pressure of the torque converter 62 to be equal to or greater than a predetermined required pressure.

The device is configured to increase the inlet pressure of the torque converter 62 by increasing the outlet pressure of the torque converter 62 when the inlet pressure of the torque converter 62 is lower than a predetermined required pressure. Consequently, a value of the inlet pressure is maintained to be equal to or greater than a predetermined required pressure.

The control part 2 includes the outlet relief valve 18, the proportional control valve 19 and the controller 15. The outlet relief valve 18 is connected to the outlet of the torque converter 62. The proportional control valve 19 can control the relief pressure of the outlet relief valve 18. The controller 15 controls the proportional control valve 19 in accordance with the inlet pressure of the torque converter 62.

In the device, the controller 15 controls a solenoid of the proportional control valve 19 with an electric signal in accordance with the inlet pressure, and the proportional control valve 19 controls the relief pressure of the outlet relief valve 18. The outlet pressure of the torque converter 62 is thereby regulated. In other words, the inlet pressure of the torque converter 62 is feedback-controlled by the controller through the outlet pressure. Consequently, it is possible to prevent the inlet pressure from being reduced to a predetermined required pressure or less.

5. Pressure Regulation Device of Fluid-Type Power Transmission Device

Third Embodiment

(1) Torque Converter and Hydraulic Circuit

Figure 8:
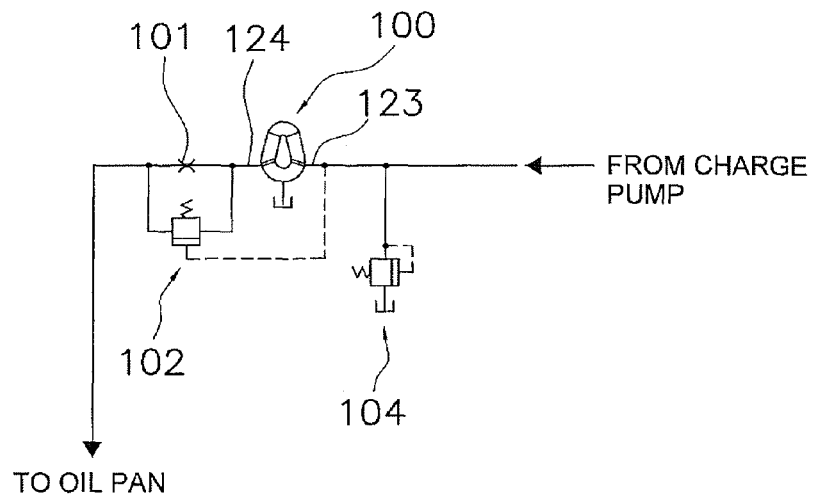
FIG. 8 is a schematic diagram of a torque converter and a hydraulic circuit according to a third embodiment of the present invention.

FIG. 8 partially illustrates a hydraulic circuit of a pressure regulation device of a fluid type power transmission device according to an embodiment of the present invention. The device is mainly composed of a torque converter 100 and an outlet pressure regulation valve 102.

The composition of the torque converter 100 is the same as that of the first embodiment.

An orifice 101 and the outlet pressure regulation valve 102 are connected to an outlet 124 of the torque converter 100 while being parallel to each other.

The outlet pressure regulation valve 102 is configured to control the pressure of an inlet 123 by regulating the pressure of the outlet 124 of the torque converter 100. More specifically, the outlet pressure regulation valve 102 has a function of detecting the inlet pressure of the torque converter 100 and regulating the outlet pressure of the torque converter 100 in accordance with the detected inlet pressure.

(2) Control Part

Figure 9:
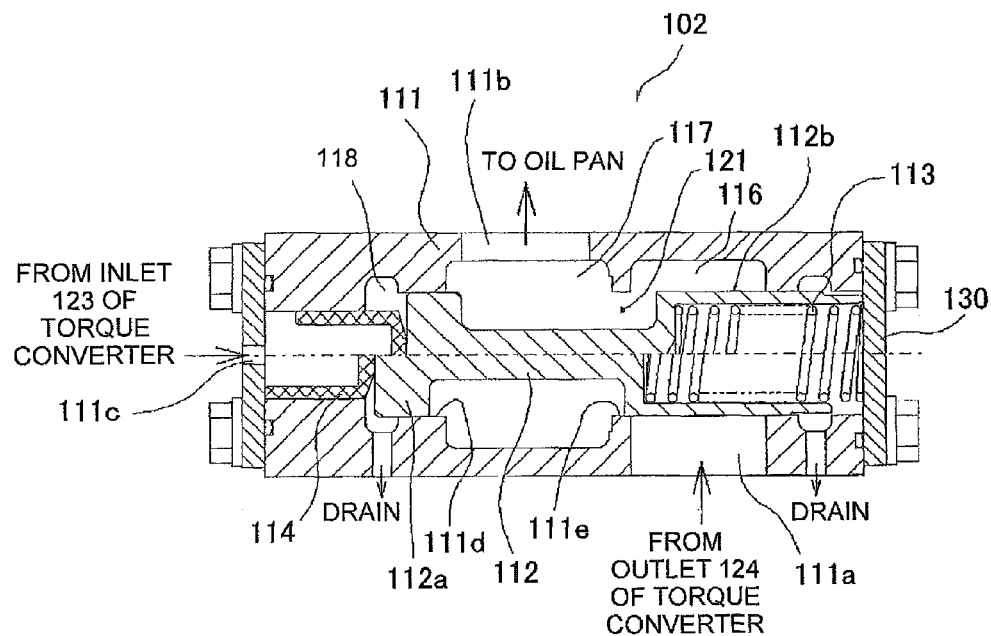
FIG. 9 is an example cross-sectional view of an outlet pressure regulation valve.

FIG. 9 illustrates an example cross-sectional view of the outlet pressure regulation valve 102 as the control part.

The outlet pressure regulation valve 102 is mainly composed of a cylinder 111, a spool 112 disposed within the cylinder 111, a coil spring 113 and a piston 114. The cylinder 111 mainly includes a first chamber 116, a second chamber 117 and a third chamber 118 in its interior. A first port 111a is formed in the first chamber 116. An oil path, extended from the outlet 124 of the torque converter 100, is connected to the first port 111a. The second chamber 117 is continued to the first chamber 116. Further, a second port 111b is formed in the second chamber 117. An oil path, extended to the oil pan, is connected to the second port 111b. The third chamber 118 is connected to the second chamber 117. Further, a third port 111c is formed in the third chamber 118. The inlet pressure at the inlet 123 of the torque converter 100 is introduced into the third chamber 118 through the third port 111c.

An end of the spool 112 accommodated in the cylinder 111 is disposed on the first chamber 116 side, whereas the other end thereof is disposed on the third chamber 118 side. The spool 112 has a large diameter portion 112a on the third chamber 118 side. The large diameter portion 112a can slide along an annular boundary portion 111d formed between the second chamber 117 and the third chamber 118. The large diameter portion 112a blocks communication between the second chamber 117 and the third chamber 118. The spool 112 has a large-diameter tubular portion 112b on the first chamber 116 side. The tubular portion 112b can slide along an annular boundary portion 111e formed between the first chamber 116 and the second chamber 117. When the spool 112 moves to the first chamber 116 side, the tubular portion 112b subsequently slides away from the boundary portion 111e. Accordingly, the first chamber 116 and the second chamber 117 communicate with each other. When the spool 112 is moved farthest towards the first chamber 116 (upper part in FIG. 9), a communication opening 121 formed between the first chamber 116 and the second chamber 117 has the maximum area. Contrarily, when the spool 112 is moved farthest towards the third chamber 118 (lower side in FIG. 9), the tubular portion 112b makes contact with the boundary portion 111e. Accordingly, communication is blocked between the first chamber 116 and the second chamber 117.

The coil spring 113 is accommodated in the tubular portion 112b of the spool 112. The coil spring 113 is supported by a plate 130 and urges the spool 112 towards the third chamber 118. On the other hand, the oil pressure within the third chamber 118 due to the inlet pressure introduced from the inlet 123 of the torque converter 100 urges the spool 112 towards the first chamber 116. Therefore, the spool 112 is held at a position where the oil pressure within the third chamber 118 and the spring force of the coil spring 113 are balanced.

The area of the communication opening 121 formed between the first chamber 116 and the second chamber 117 varies in accordance with a position that the spool 112 is held. When the area of the communication opening 121 is reduced or eliminated, the outlet pressure is increased. Contrarily, when the area of the communication opening 121 is increased, the outlet pressure is reduced.

(3) Control Actions

Figure 10:
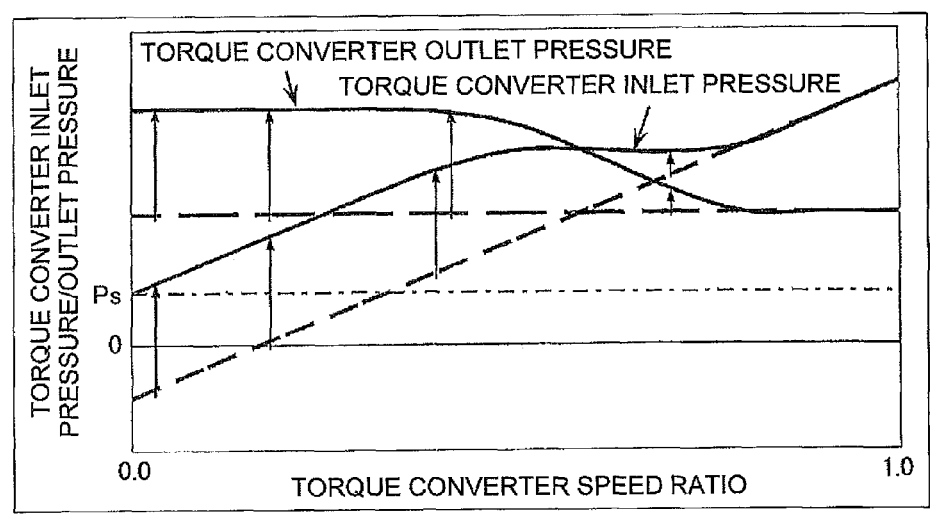
FIG. 10 is a schematic chart for exemplifying variation in the inlet/outlet pressure of the torque converter with respect to the speed ratio of the torque converter in the application of the third embodiment of the present invention.

FIG. 10 is a schematic chart of an example of variation in the inlet pressure and the outlet pressure of the torque converter 100 with respect to the speed ratio of the torque converter 100 in the present embodiment. Note the inlet pressure and the outlet pressure of the present embodiment are shown with solid lines, whereas those of the conventional art are shown with dashed lines.

In the present embodiment (solid lines) in FIG. 10, the outlet pressure gradually increases in proportion to a reduction in the speed ratio from 1 to 0. Accordingly, the inlet pressure of the present embodiment gradually gets higher than that of the conventional art in proportion to a reduction in the speed ratio from 1 to 0. Consequently, the inlet pressure is maintained to be higher than the baseline pressure Ps.

Actions of the outlet pressure regulation valve 102 will be hereinafter explained.

The inlet pressure of the torque converter 100 is high under the condition that the speed ratio of the torque converter is equal to or roughly 1. Accordingly, the oil pressure to be generated in the third chamber 118 is sufficiently large. Therefore, the spool 112 is moved farthest towards the first chamber 116 and the end of the tubular portion 112b makes contact with the plate 130. Therefore, the opening 121 formed between the first chamber 116 and the second chamber 117 has the maximum area (condition of the upper side in FIG. 9).

On the other hand, the inlet pressure of the torque converter 100 decreases in proportion to a reduction in the speed ratio. Accordingly, the oil pressure of the third chamber 118 decreases. When the oil pressure of the third chamber 118 subsequently gets smaller than the spring force of the coil spring 113, the spool 112 is pushed by the coil spring 113 and is moved towards the third chamber 118. The area of the communication opening 121 formed between the first chamber 116 and the second chamber 117 is accordingly reduced. Consequently, the outlet pressure of the torque converter 100 increases, and the inlet pressure accordingly increases. The outlet pressure regulation valve 102 thus regulates the inlet pressure and the outlet pressure of the torque converter 100. As a result of the pressure regulation by the outlet pressure regulation valve 102, the spool 112 is held at a position where the oil pressure of the third chamber 118 and the spring force of the coil spring 113 are balanced.

Note that an increase in the inlet pressure of the torque converter 100 results in the opposite actions.

Sizes of the components of the outlet pressure regulation valve 102 and a spring constant of the first coil spring 113 are designed for maintaining the inlet pressure of the torque converter 100 to be equal to or greater than a required pressure (specifically, the baseline pressure Ps in the present example) and further for having the aforementioned pressure regulation function.

(4) Advantageous Effects of Third Embodiment (a) In the device, the outlet pressure regulation valve 102 regulates the pressure of the outlet 124 of the torque converter 100 for controlling the pressure of the inlet 123. As a result, it is possible to inhibit reduction in the pressure of the inlet 123 of the torque converter 100. In the present embodiment, it is possible to maintain the pressure of the inlet 123 of the torque converter 100 to be higher than a predetermined required pressure. Based on the above, cavitation does not easily occur in the working fluid and it is possible to prevent drawbacks such as degradation in performance of the torque converter 100 and erosion of the blade wheels.

(b) The outlet pressure regulation valve 102 detects the inlet pressure of the torque converter 100 and regulates the outlet pressure of the torque converter 100 in accordance with the detected inlet pressure. As a result, the inlet pressure of the torque converter 100 is feedback-controlled by the outlet pressure regulation valve 102 through the outlet pressure. It is thereby possible to prevent the inlet pressure from being reduced to a predetermined required pressure or less.

(c) The outlet pressure regulation valve 102 is an outlet relief valve connected to the outlet 124 of the torque converter 100. The outlet pressure regulation valve 102 can regulate the outlet pressure in accordance with the inlet pressure of the torque converter 100. When the inlet pressure of the torque converter 100 is reduced, the outlet pressure regulation valve 102 is configured to increase the outlet pressure. With the configuration, the inlet pressure of the torque converter 100 is feedback-controlled by the outlet pressure regulation valve 102 through the outlet pressure. It is thereby possible to prevent the inlet pressure from being reduced to a predetermined required pressure or less.

6. Pressure Regulation Device of Fluid-Type Power Transmission Device

Fourth Embodiment

Figure 11:
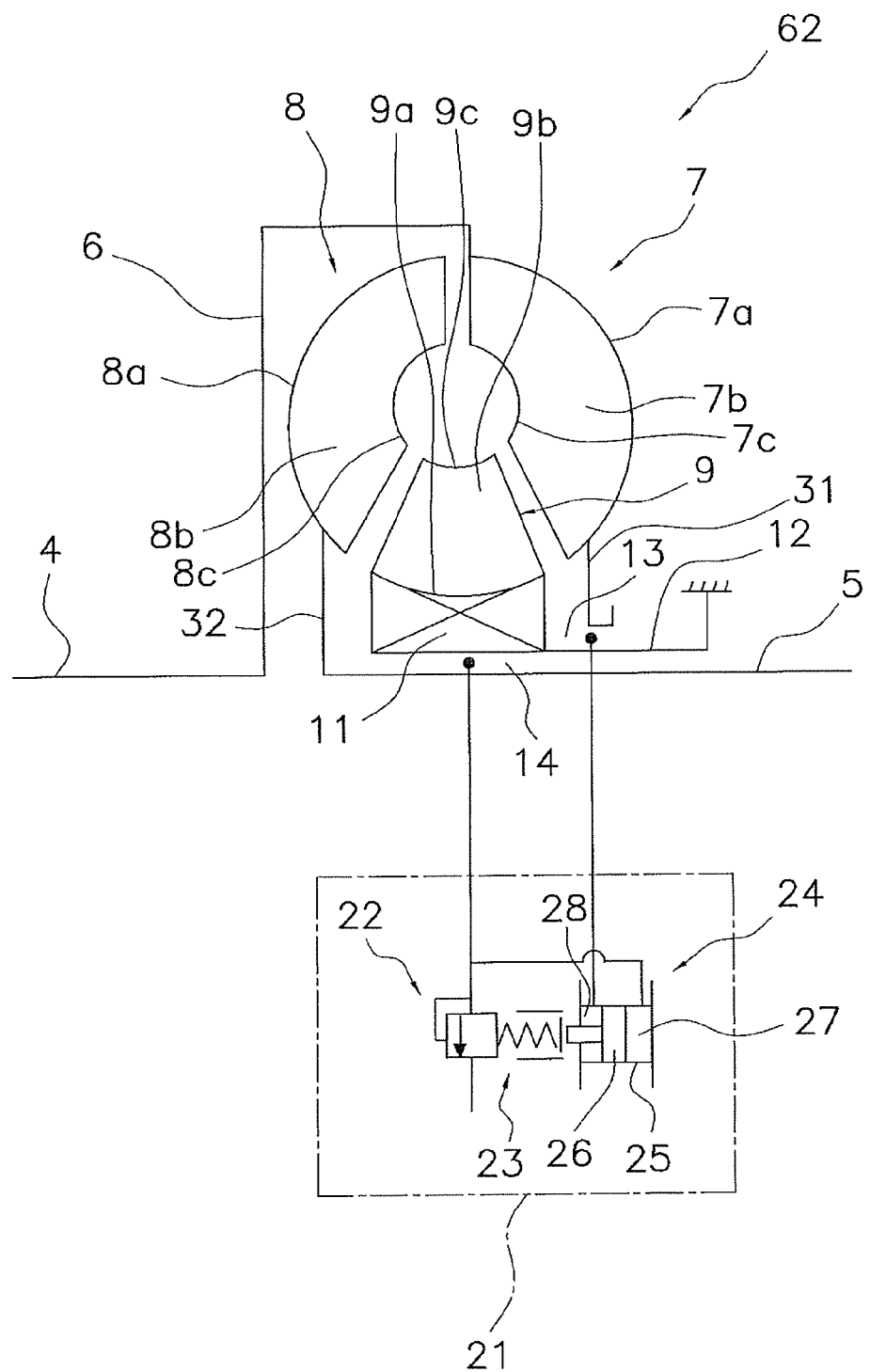
FIG. 11 is a schematic view of a pressure regulation device for a torque converter according to a fourth embodiment of the present invention.

FIG. 11 illustrates a schematic view of a pressure regulation device of a fluid type power transmission device according to an embodiment of the present invention. The device is mainly composed of the torque converter 62 and the control part 21.

(1) Torque Converter

The torque converter 62 of the present embodiment has the same composition as that of the first embodiment.

(2) Control Part

Control part 21 is configured to control the outlet pressure of the torque converter 62. More specifically, a relief valve 22 is connected to the outlet 14 of the torque converter 62, and other components of the control part 21 operate the relief valve 22 for controlling the outlet pressure.

The control part 21 includes the relief valve 22, a load spring 23 provided in the relief valve 22, and an inlet-outlet pressure difference detection valve 24. The load spring 23 applies a load to the relief valve 22. The load spring 23 sets the relief pressure of the relief valve 22. The inlet-outlet pressure difference detection valve 24 compresses the load spring 23 in accordance with a difference between the inlet pressure and the outlet pressure. The inlet-outlet pressure difference detection valve 24 includes a cylinder 25 and an inlet-outlet pressure difference detection piston 26. The inlet-outlet pressure difference detection piston 26 is disposed in the cylinder 25, and forms a first chamber 27 and a second chamber 28 one before the other. The outlet pressure is introduced into the first chamber 27 from the outlet 14, whereas the inlet pressure is introduced into the second chamber 28 from the inlet 13. A protrusion of the inlet-outlet pressure difference detection piston 26 makes contact with the load spring 23. With the above structure, the inlet-outlet pressure difference detection piston 26 is configured to compress the load spring 23 when the pressure (outlet pressure) of the first chamber 27 gets higher than the pressure (inlet pressure) of the second chamber 28. The load spring 23 is compressed to a position where a balance is produced between the load of the load spring 23 and the press force against the inlet-outlet pressure difference detection piston 26 to be generated by a difference between the pressure of the first chamber 27 and that of the second chamber 28.

(3) Control Actions

The inlet pressure is higher than the outlet pressure under the condition that the speed ratio of the torque converter is equal to or roughly 1. The pressure of the first chamber 27 is accordingly lower than the pressure of the second chamber 28. Therefore, the inlet-outlet pressure difference detection piston 26 of the inlet-outlet pressure difference detection valve 24 is pushed to the rightward in FIG. 11. In other words, the inlet-outlet pressure difference detection piston 26 does not compress the load spring 23.

However, the inlet pressure decreases in proportion to a reduction in the speed ratio. Therefore, the inlet pressure subsequently gets lower than the outlet pressure. In this case, the pressure of the first chamber 27 gets higher than that of the second chamber 28. The inlet-outlet pressure difference detection piston 26 is pushed to the leftward in FIG. 11 and compresses the load spring 23. The load spring 23 is compressed to a position where a balance is produced between the load of the load spring 23 and the press force against the inlet-outlet pressure difference detection piston 26 to be caused by a difference between the pressure of the first chamber 27 and that of the second chamber 28. When the load spring 23 is compressed, the load is increased. Accordingly, the relief set pressure of the relief valve 22 is increased. As a result, the outlet pressure to be regulated by the relief valve 22 is increased.

When the pressure of the first chamber 27 is greater than that of the second chamber 28 and a difference between them gets larger, the force for pushing the inlet-outlet pressure difference detection piston 26 leftward in FIG. 11 gets larger. Accordingly, the load of the load spring 23 gets larger and the outlet pressure gets larger. In other words, when the outlet pressure is higher than the inlet pressure and a difference between them gets larger, the outlet pressure accordingly gets larger.

Figure 12:
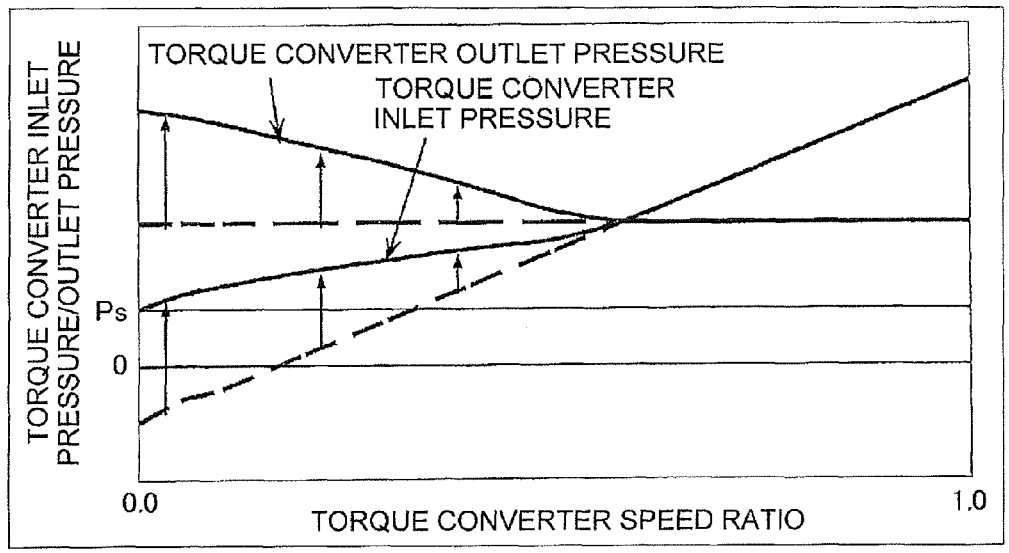
FIG. 12 is a schematic chart for exemplifying variation in the inlet/outlet pressure of the torque converter with respect to the speed ratio of the torque converter in the application of a fourth embodiment of the present invention.
Figure 13:
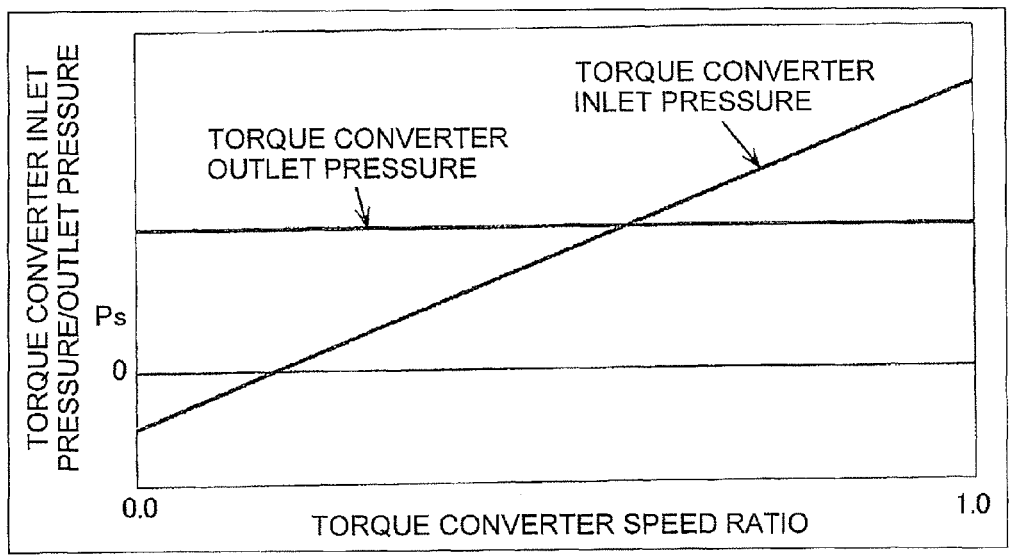
FIG. 13 is a schematic chart for exemplifying variation in the inlet/outlet pressure of the torque converter with respect to the speed ratio of the torque converter in the conventional art.

FIG. 12 is a schematic chart of an example of variation in the inlet pressure and the outlet pressure of the torque converter with respect to the speed ratio of the torque converter in the present embodiment. The inlet pressure and the outlet pressure of the present embodiment are shown with solid lines, whereas those of the conventional art are shown with dashed lines.

The inlet pressure of the present embodiment is higher than that of the conventional example under the condition that the speed ratio of the torque converter is equal to or roughly 0. The inlet pressure is not lower than a predetermined required pressure (shown as Ps in FIG. 12).

Therefore, it is possible to inhibit cavitation in the working fluid caused by a reduction in the inlet pressure and prevent drawbacks such as degradation in performance of the torque converter 62 and erosion of the blade wheels. Further in the present embodiment, the inlet pressure of the torque converter can be set to be roughly the same as that of the conventional art under the condition that the speed ratio is high.

(4) Advantageous Effects of Fourth Embodiment (a) In the device, the control part 21 regulates the outlet pressure of the torque converter 62 for controlling the inlet pressure. As a result, it is possible to inhibit reduction in the inlet pressure of the torque converter 62 and maintain the inlet pressure to be higher than a predetermined required pressure. Therefore, cavitation does not easily occur in the working fluid and it is possible to prevent drawbacks such as degradation in performance of the torque converter 62 and erosion of the blade wheels.

(b) The pressure regulation device of the fluid type power transmission device further includes the inlet-outlet pressure difference detection valve 24 for comparing the inlet pressure of the torque converter 62 and the outlet pressure thereof. The control part 21 regulates the outlet pressure of the torque converter 62 in accordance with a result of the comparison. In the device, the inlet-outlet pressure difference detection valve 24 compares the inlet pressure of the torque converter 62 and the outlet pressure thereof, and the control part 21 regulates the outlet pressure of the torque converter 62 in accordance with a result of the comparison between the inlet pressure and the outlet pressure. Accordingly, the inlet pressure of the torque converter 62 is controlled in accordance with a result of the comparison between the inlet pressure and the outlet pressure. Consequently, it is possible to prevent the inlet pressure from being reduced to a predetermined required pressure or less.

(c) When the inlet pressure gets lower than the outlet pressure, the control part 21 is configured to increase the outlet pressure in accordance with a difference between the inlet pressure and the outlet pressure. In the device, when the inlet pressure is higher than the outlet pressure, the outlet pressure is set to be the same as that of the conventional art. When the inlet pressure gets lower than the outlet pressure, however, the outlet pressure is increased in accordance with a difference between the outlet pressure and the inlet pressure.

The inlet pressure is basically higher than the outlet pressure under the condition that the speed ratio is high. In some cases, however, the inlet pressure decreases in proportion to reduction in the speed ratio, and the inlet pressure gets lower than the outlet pressure under the condition that the speed ratio is low. In such cases, the device is configured to maintain the outlet pressure to be constant under the condition that the speed ratio is high, just like the conventional art. However, the control part is configured to increase the outlet pressure in accordance with a difference between the inlet pressure and the outlet pressure under the condition that the speed ratio is low. As a result, the outlet pressure increases in proportion to reduction in the speed ratio under the condition that the speed ratio is low. In other words, the inlet pressure of the fluid type power transmission device is controlled in accordance with a result of the comparison between the inlet pressure and the outlet pressure. Consequently, it is possible to inhibit the inlet pressure from being reduced to a predetermined required pressure or less.

(d) The inlet-outlet pressure difference detection valve 24 includes the inlet-outlet pressure difference detection piston 26. The control part 21 includes the outlet relief valve 22 connected to the outlet 14 of the torque converter 62. The outlet relief valve 22 includes a valve (not illustrated in the figure) and the load spring 23 for applying load to the valve. When the outlet pressure gets higher than the inlet pressure, the inlet-outlet pressure difference detection piston 26 compresses the load spring 23. Accordingly, the load applied to the valve by the load spring 23 is increased. Therefore, the relief pressure of the outlet relief valve 22 is increased, and the outlet pressure of the torque converter 62 is increased. When the outlet pressure is higher than the inlet pressure and a difference between them gets larger, the inlet-outlet pressure difference detection piston 26 further compresses the load spring 23. Accordingly, the load applied to the valve by the load spring 23 is further increased. Consequently, the relief pressure of the outlet relief valve 22 is further increased.

The inlet pressure is basically higher than the outlet pressure under the condition that the speed ratio is high. In some cases, however, the inlet pressure decreases in proportion to reduction in the speed ratio. Then, the inlet pressure gets lower than the outlet pressure under the condition that the speed ratio is low, and a difference between the inlet pressure and the outlet pressure gets larger as the speed ratio gets closer to 0. In such cases, the device is configured to maintain the outlet pressure to be constant under the condition that the speed ratio is high and the inlet pressure is higher than the outlet pressure, just like the conventional art. However, the control part is configured to increase the outlet pressure in accordance with a difference between the inlet pressure and the outlet pressure under the condition that the speed ratio is low and the inlet pressure is lower than the outlet pressure. As a result, the outlet pressure increases in proportion to reduction in the speed ratio under the condition that the speed ratio is low. In other words, the inlet pressure of the fluid type power transmission device is controlled in accordance with a result of the comparison between the inlet pressure and the outlet pressure. Consequently, it is possible to inhibit the inlet pressure from being reduced to a predetermined required pressure or less.

7. Other Embodiments

The aforementioned embodiments of the present invention are exemplified for explanation purpose only, and can be changed as needed. Specifically, the pressure regulation device of the fluid type transmission device of the present invention is not limited to the aforementioned embodiments.

Further, the charts showing a relation of the inlet and outlet pressures with respect to the speed ratio of the torque converter, used for explaining the aforementioned embodiments, are schematically illustrated for explanation purpose. Application of the present invention is not limited to a case that the inlet pressure decreases in proportion to reduction in the speed ratio. In other words, the present invention can be applied to any cases regardless of a relation of the inlet and outlet pressures with respect to the speed ratio of the torque converter.

The aforementioned embodiments disclose the torque converter. However, the number of components and the number of stages in the torque converter are not limited to the aforementioned embodiments.

The present invention is also applicable to a torque converter provided with a lock-up device, for instance.

The present invention is also applicable to a fluid coupling.

The wheel loader has been exemplified in the aforementioned embodiments of the present invention. However, the present invention is obviously applicable to other construction machines excluding the wheel loader or other vehicles excluding the construction machines (e.g., buses, trucks, passenger vehicles and agricultural work vehicles).

A pressure regulation device for a fluid power transmission device of the above illustrated embodiments can control the inlet pressure by controlling the outlet pressure. Therefore, it is applicable to a variety of vehicles, especially to the construction machines and the industrial machines.

The invention claimed is:

1. A fluid type power transmission system comprising:
a fluid type power transmission device including an inlet part and an outlet part for a working fluid, the fluid type power transmission device being configured to transmit power in response to circulation of the working fluid in the interior thereof; and
a control part that includes a rotation speed detection part configured and arranged to detect an input rotation speed and an output rotation speed of the fluid type power transmission device, the control part being configured to control a pressure of the working fluid in the inlet part by regulating a pressure of the working fluid in the outlet part of the fluid type power transmission device in accordance with a speed ratio between the input rotation speed and the output rotation speed of the fluid type power transmission device.

2. The fluid type power transmission system according to claim 1, wherein
the control part is configured to increase the pressure of the working fluid in the outlet part of the fluid type power transmission device in proportion to reduction in the speed ratio of the fluid type power transmission device.

3. The fluid type power transmission system according to claim 1, wherein
the control part includes an outlet relief valve, a control valve and a controller, the outlet relief valve being connected to the outlet part of the fluid type power transmission device, the control valve being configured to control a relief pressure of the outlet relief valve, and the controller being configured to control the control valve in accordance with the speed ratio.

4. A fluid type power transmission system comprising:
a fluid type power transmission device including an inlet part and an outlet part for a working fluid, the fluid type power transmission device being configured to transmit power in response to circulation of the working fluid in the interior thereof; and
a control part that includes a rotation speed detection part configured and arranged to detect an input rotation speed and an output rotation speed of the fluid type power transmission device, the control part being configured to control a pressure of the working fluid in the inlet part by regulating a pressure of the working fluid in the outlet part of the fluid type power transmission device in accordance with the input rotation speed and a speed ratio between the input rotation speed and the output rotation speed of the fluid type power transmission device.

5. The fluid type power transmission system according to claim 4, wherein
the control part is configured to increase the pressure of the working fluid in the outlet part of the fluid type power transmission device in proportion to reduction in the speed ratio of the fluid type power transmission device, and is further configured to regulate increase in the pressure of the working fluid in the outlet part in accordance with the input rotation speed.

6. The fluid type power transmission system according to claim 4, wherein
the control part includes an output relief valve, a control valve and a controller, the outlet relief valve being connected to the outlet part of the fluid type power transmission device, the control valve being configured to control a relief pressure of the outlet relief valve, and the controller being configured to control the control valve in accordance with the input rotation speed and the speed ratio.

7. A fluid type power transmission system comprising:
a fluid type power transmission device including an inlet part and an outlet part for a working fluid, the fluid type power transmission device being configured to transmit power in response to circulation of the working fluid in the interior thereof; and
a control part that is configured to control a pressure of the working fluid in the inlet part by regulating a pressure of the working fluid in the outlet part of the fluid type power transmission device, and includes an inlet pressure detection part, an outlet relief valve, a control valve, and a controller,
the inlet pressure detection part being configured and arranged to detect a pressure of the working fluid in the inlet part of the fluid type power transmission device,
the outlet relief valve being connected to the outlet part of the fluid type power transmission device,
the control valve being configured to control a relief pressure of the outlet relief valve, and
the controller being configured to control the control valve based on the pressure detected by the inlet pressure detection part such that the pressure of the working fluid in the outlet part of the fluid type power transmission device is regulated in accordance with the pressure of the working fluid in the inlet part of the fluid type power transmission device.

8. A fluid type power transmission system comprising:
a fluid type power transmission device including an inlet part and an outlet part for a working fluid, the fluid type power transmission device being configured to transmit power in response to circulation of the working fluid in the interior thereof; and
a control part that is configured to control a pressure of the working fluid in the inlet part by regulating a pressure of the working fluid in the outlet part of the fluid type power transmission device and includes an inlet pressure detection part and an outlet relief valve,
the inlet pressure detection part being configured and arranged to detect a pressure of the working fluid in the inlet part of the fluid type power transmission device, and
the outlet relief valve being connected to the outlet part of the fluid type power transmission device, and being configured to regulate a relief pressure in accordance with the pressure of the working fluid in the inlet part of the fluid type power transmission device, and to increase the relief pressure when the pressure of the working fluid in the inlet part of the fluid type power transmission device decreases.

9. A fluid type power transmission system comprising:
a fluid type power transmission device including an inlet part and an outlet part for a working fluid, the fluid type power transmission device being configured to transmit power in response to circulation of the working fluid in the interior thereof; and
a control part that is configured to control a pressure of the working fluid in the inlet part by regulating a pressure of the working fluid in the outlet part of the fluid type power transmission device, and includes a comparison part, an outlet relief valve, a control valve, and a controller,
  the comparison part being configured to compare the pressure of the working fluid in the inlet part of the fluid type power transmission device with the pressure of the working fluid in the outlet part of the fluid type power transmission,
  the outlet relief valve being connected to the outlet part of the fluid type power transmission device,
  the control valve being configured to control a relief pressure of the outlet relief valve, and
  the controller being configured to control the control valve in accordance with a result of the comparison between the pressure of the working fluid in the inlet part of the fluid type power transmission device and the pressure of the working fluid in the outlet part of the fluid type power transmission device such that the pressure of the working fluid in the outlet part is regulated in accordance with the result of the comparison.

10. A fluid type power transmission system comprising:
a fluid type power transmission device including an inlet part and an outlet part for a working fluid, the fluid type power transmission device being configured to transmit power in response to circulation of the working fluid in the interior thereof; and
a control part that is configured to control a pressure of the working fluid in the inlet part by regulating a pressure of the working fluid in the outlet part of the fluid type power transmission device, and includes a comparison part and an outlet relief valve,
  the comparison part including an inlet-outlet pressure difference detection piston configured and arranged to detect a pressure difference between the pressure of the working fluid in the inlet part of the fluid type power transmission device and the pressure of the working fluid in the outlet part,
  the outlet relief valve being connected to the outlet part of the fluid type power transmission device, and including a valve and a spring for applying a load to the valve, and
  the inlet-outlet pressure difference detection piston being configured to compress the spring to increase the load applied to the valve by the spring when the pressure of the working fluid in the outlet part becomes higher than the pressure of the working fluid in the inlet part such that the pressure of the working fluid in the outlet part of the fluid type power transmission device is regulated in accordance with the detected pressure difference.

\* \* \* \* \*